United States Patent [19]

Reilly

[11] Patent Number: 4,968,055
[45] Date of Patent: Nov. 6, 1990

[54] APPARATUS TO VARY AXLE ORIENTATION

[76] Inventor: Bruce J. Reilly, Campbell Street, Narellan, Australia, 2567

[21] Appl. No.: 438,987

[22] Filed: Nov. 20, 1989

Related U.S. Application Data

[63] Continuation of Ser. No. 344,482, Apr. 12, 1989, abandoned, which is a continuation of Ser. No. 116,584, Nov. 4, 1987, abandoned.

[30] Foreign Application Priority Data

Jul. 28, 1987 [AU] Australia .................................. PI3385

[51] Int. Cl.$^5$ ............................................. B62D 17/00
[52] U.S. Cl. .................................... 280/661; 105/222;
267/141.2; 267/293; 280/675; 384/281;
384/295; 403/4; 403/162; 403/DIG. 8
[58] Field of Search ............................. 267/141.2, 293;
105/218.1, 220, 222; 301/111, 5 BA; 280/661,
673, 675, 682; 384/280, 281, 295; 403/4, 162,
DIG. 8

[56] References Cited

U.S. PATENT DOCUMENTS

| | | |
|---|---|---|
| Re. 24,374 | 10/1957 | Martin . |
| 1,784,268 | 12/1930 | Buckendale et al. . |
| 2,137,699 | 11/1938 | Price . |
| 2,814,501 | 11/1957 | Clark et al. . |
| 2,843,395 | 7/1958 | Brumbaugh . |
| 2,914,349 | 11/1959 | Small . |
| 3,124,370 | 3/1964 | Traugott . |
| 3,142,493 | 7/1964 | Hartzell et al. . |
| 3,342,507 | 9/1967 | Koch et al. . |
| 3,367,677 | 2/1968 | Preddy, Jr. . |
| 3,458,213 | 7/1969 | Chaney . |
| 3,473,820 | 10/1969 | Chaney . |
| 3,625,538 | 12/1971 | Raidel . |
| 3,749,196 | 7/1973 | Traylor ................................ 180/85 |
| 3,866,938 | 2/1975 | Boyd et al. . |
| 3,907,324 | 9/1975 | Mastin .............................. 280/104.5 |
| 3,913,937 | 10/1975 | Longworth et al. ............. 280/104.5 |
| 4,093,272 | 6/1978 | Raidel . |
| 4,184,698 | 1/1980 | Raidel . |
| 4,202,564 | 5/1980 | Strader . |
| 4,500,110 | 2/1985 | McWhorter et al. ............... 280/680 |
| 4,619,544 | 10/1986 | Laidely .............................. 403/162 |
| 4,699,399 | 10/1987 | Jable et al. ......................... 280/680 |

FOREIGN PATENT DOCUMENTS

| | | | |
|---|---|---|---|
| 3131107 | 12/1982 | Fed. Rep. of Germany ...... | 280/661 |
| 167808 | 10/1982 | Japan .................................. | 280/661 |

OTHER PUBLICATIONS

Description and Drawings of Henri Cam (2 pages) (date unknown).

Primary Examiner—George E. A. Halvosa
Attorney, Agent, or Firm—Fleit, Jacobson, Cohn, Price, Holman & Stern

[57] ABSTRACT

A device for changing the axle orientation in a balance beam suspension operates by introducing a variable axial eccentricity between an axle carrier and the beam hanger to vary the amount of yaw on the axle to enable the wheels on the axle to be oriented in alignment with the vehicle axis.

4 Claims, 4 Drawing Sheets

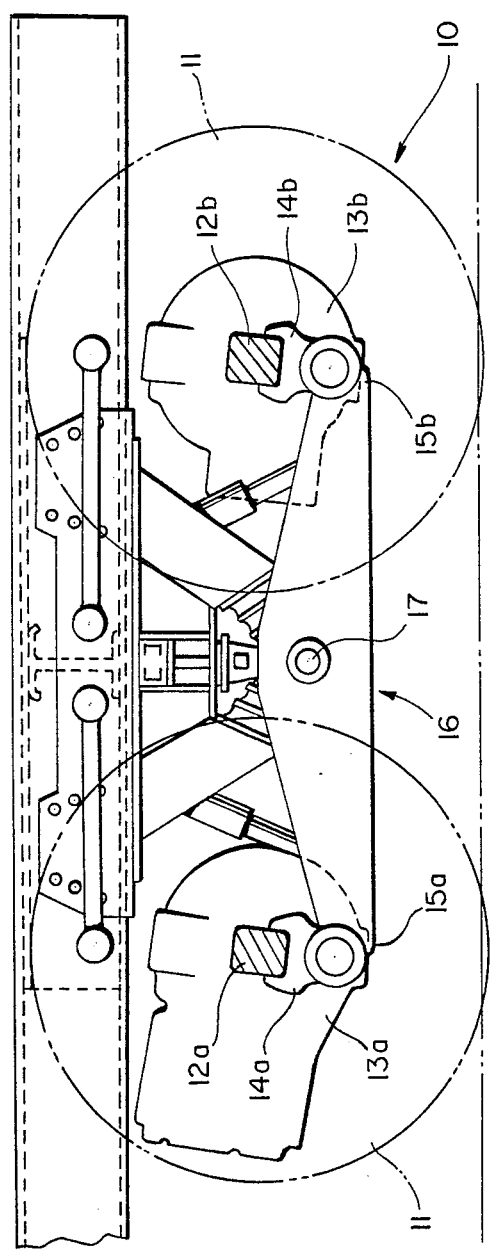

APPARATUS TO VARY AXLE ORIENTATION

This application is a continuation application of application Ser. No. 07/344,482, filed Apr. 12, 1989, now abandoned, which is a continuation application of application Ser. No. 07/116,584, filed Nov. 4, 1987, now abandoned.

The present application relates to a device used to vary the orientation of axles in heavy vehicles. In particular, the present application relates to axle orientation in bogie axled vehicles which include a balance beam, or walking beam suspension.

Balance beam or walking beam suspension systems are also known in the art as "Hendrickson" suspensions because the system was pioneered by the Hendrickson family and is still marketed worldwide by a group of companies of the same name. The term "balance beam suspension" will be used hereinafter.

In a balance beam suspension, a pair of parallel vehicle axles are pivotally connected together by a pair of equalizer beams which extend at right angles to the axles. The equalizer beams are in turn pivotally connected to the body of the vehicle. The equalizer beams are therefore oriented in a direction parallel to the longitudinal center line of the vehicle chassis. For a number of reasons it is possible that one or both of the axles in a balance beam suspension are not oriented perfectly square to the longitudinal or center line of the vehicle's chassis, which results in wheel misalignment.

Poor wheel alignment is highly undesirable, causing a vehicle to "crab" requiring constant driver correction. It can result in up to 50% loss in tyre life for steering wheels through scrubbing, increased fuel consumption due to increased rolling resistance, increases load on steering geometry with consequential added repair costs and increased driver fatigue. The conventional practice to realigning an axle in a balance beam suspension is to cut off the axle saddle bracket which provides the pivotal connection between the equalizer arm and the axle, reposition the axle such that it is oriented correctly with respect to the chassis and then to reweld the axle saddle bracket. Skilled addressees will immediately recognize that the cutting and welding of vehicle parts that are subject to cyclic loadings and which were not designed with such a practice in mind is highly undesirable, notwithstanding any degree of skill with which the cutting and welding is carried out. However, apart from this existing practice, there is no solution available to correct axle orientation in balance beam suspension systems.

According to the present invention there is provided an axle alignment device for a balance beam suspension system comprising:

an axially extending sleeve which is engageable in an equalizer beam end bushing, a pair of adaptors, each having a first longitudinally extending part which is engageable in a respective end of said sleeve and each having a second longitudinally extending part which is engageable in a respective beam hanger of an axle saddle bracket associated with said end bushing;

wherein said first and second parts of said adaptors are axially eccentric.

The present invention will now be described by way of example with reference to the accompanying drawings, in which:

FIG. 1 is an elevation of one form of a balance beam suspension;

Figure 2A:
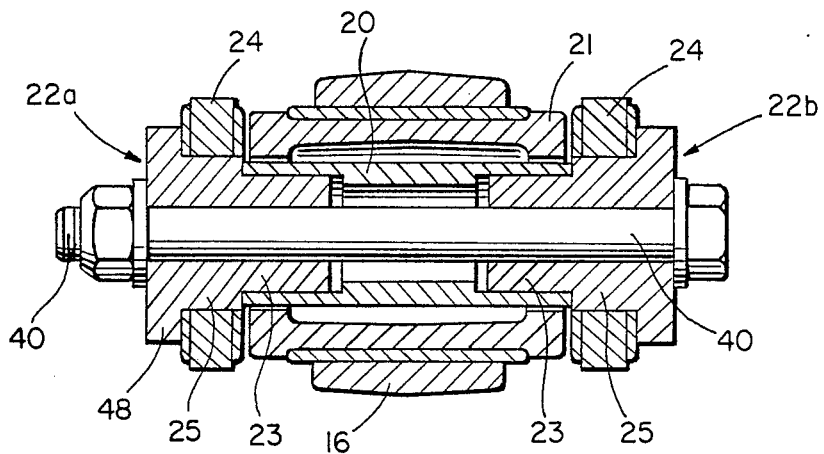
FIG. 2A is a cross-sectional elevation view of a preferred embodiment of the present invention.

FIG. 1 shows one form of a balance beam suspension 10. Only those features relevant to the present invention will be discussed hereunder and the wheels 11 of the vehicle as shown by dot-and-dash outlines are included in order to clarify the following description. A pair of bogie axles 12a, 12b are each connected on opposite sides of respective differential housings 13a, 13b by saddle brackets 14a, 14b to opposite ends 15a, 15b of an equalizer beam 16. Only one equalizer beam 16 is illustrated but it should be remembered that the entire arrangement illustrated is duplicated on the opposite side of the differential housings 13a, 13b. Because the equalizer arm is relatively stiff and is allowed to at least partially rotate about pivot point 17, the system tends to equalize the loads acting on the two axles 12a and 12b. The present invention relates to the connection of the axle saddle brackets 14a and 14b to the equalizer beam ends 15a and 15b respectively.

Figure 2B:
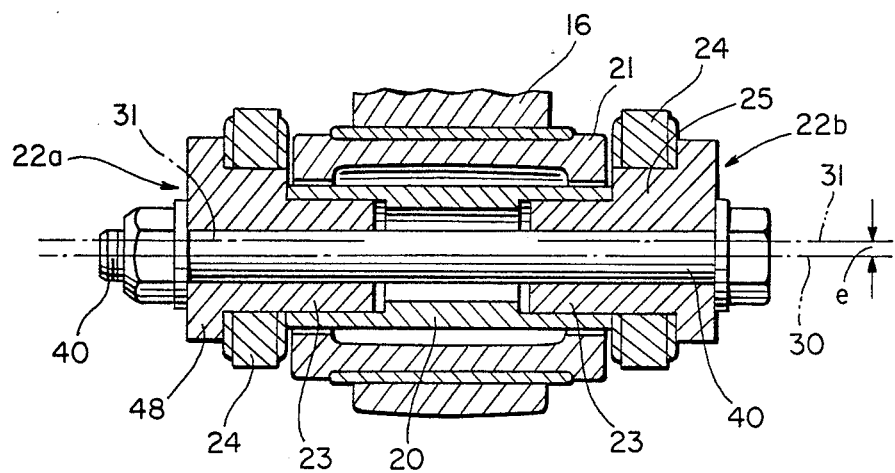
FIG. 2B is a cross-sectional plan view of one preferred embodiment of the present invention of FIG. 2A.

Referring to FIGS. 2A and 2B, it can be seen that the present embodiment comprises an axially extending sleeve 20 which is illustrated engaged in the beam end bushing 21 of an equalizer beam 16. Adapters 22a, 22b are each engaged in a respective end of the sleeve 20 by way of first longitudinally extending part 23 and are also each engaged in respective hangers 24 of a saddle axle bracket by way of second longitudinally extending part 25. In FIG. 2B the axis of symmetry of the first parts 23 of the adaptors is shown as 30 while the axis of symmetry of the second parts 25 is shown as 31. These axes are eccentric to each other by an amount e.

The conventional connection of an axle saddle bracket 14a or 14b with a respective equalizer beam end 15a or 15b concentrically aligns the end of the saddle bracket with the respective equalizer beam end. In contrast a saddle bracket connected to an equalizer beam end using the present embodiment is offset from the conventional concentrically aligned position by an amount equal to the eccentricity e, as shown in exaggerated form in FIG. 3.

Figure 3:
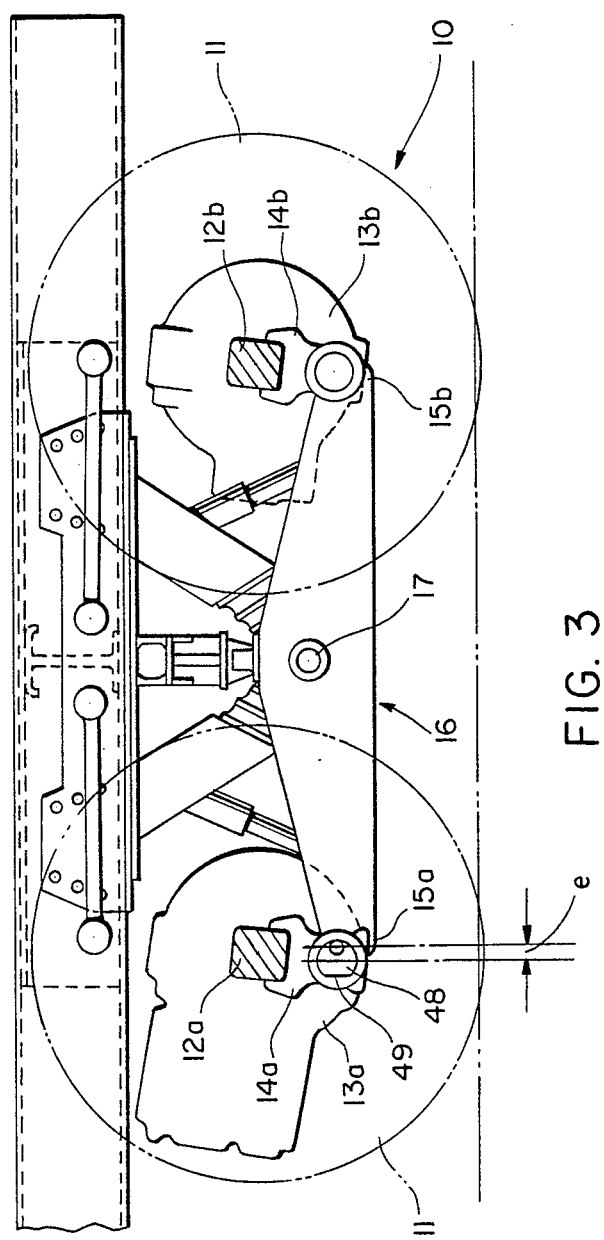
FIG. 3 is an elevation view illustrating the effect of the present invention regarding the relative relocation of components in the suspension system of FIG. 1.

As illustrated in FIG. 3, connection of the axle saddle bracket 14a to the end 15a of the equalizer arm 16 has effectively shifted the axle saddle bracket 14a away from the pivot point 17 by an amount e relative to the original position illustrated in FIG. 1. Clearly, the present embodiment could be used to relocate the saddle bracket 14a towards pivot point 17 by an amount e as easily as the relocation away from the pivot point 17 illustrated in FIG. 3 by simply rotating the adaptors through 180°.

Figure 4:
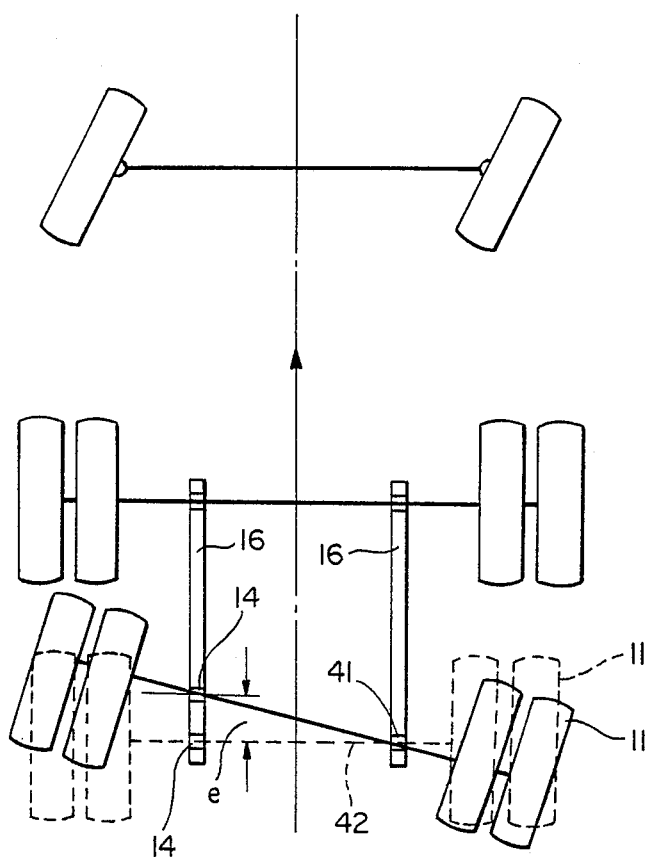
FIG. 4 is a schematic plan view showing the effect of the present invention on axle orientation.

Referring to the exaggerated diagram of FIG. 4, it can be seen that relocation of an axle saddle bracket 14 by an amount e results in a change in orientation of an axle from a first orientation shown by the solid line 41 to a second orientation shown by the broken line 42. Because the wheels 11 are rotatably fixed in the axles, it will be apparent to skilled addressees that the embodiment of the present invention will be useful in correcting poor alignment of rear wheels in a balance beam suspension which results from poor axle orientation.

Referring back to FIGS. 2A and 2B it can be seen that in the preferred embodiment there is included an axially extending bolt 40. The preferred embodiment is assembled and the bolt 40 tensioned, urging the adaptors into the sleeve 20. The second longitudinally extending parts 25 of the adaptors are compressed against the ends of the sleeve 20. Although this compressive bearing does not occur around the entire sleeve (see FIG. 2B) it does at least occur at the top and bottom of the sleeve (see FIG. 2A). Therefore, upon assembly, the preferred embodiment forms a compressively pre-stressed integral unit.

Embodiments of the present invention have adaptors which further comprise an annular flange 48 to abut against the outer surfaces of the axle saddle bracket hangers 24 and prevent dislocation of the inventive apparatus in an axial direction. In the preferred embodiment this flange is substantially circular in shape but has one flat surface 49 as can be seen from FIG. 3. This enables a simple spanner to engage the adaptor. Thus the device can be assembled and the adaptors can then be rotated to a position which relocates the axle saddle bracket 14a in the desired direction. As noted above, rotation of the adaptors through 180° compared to the orientation illustrated in FIG. 3 would relocate the axle saddle bracket 14a toward the central pivot point 17 by an amount e instead of away from same as illustrated. Furthermore, because the flat surface 48 can be manufactured in the same position on all adaptors, it can also provide an external visual indicator that the adaptors are installed correctly. A tack weld between the adaptors and hanger of the saddle bracket will ensure that the device of the present invention does not slip while in use.

The degree of axle orientation can be varied in a number of ways using the present invention. For example, depending on suspension geometry, a selection may be made of a variety of adaptors with differing eccentricities to obtain an optimum reorientation. Also, it should be noted that the relocation of only one axle saddle bracket has been described above. It would also be possible to relocate the axle saddle brackets on opposite sides of a differential housing in opposite directions. This could be done where the relocation of a single bracket is not sufficient to obtain the desired axle orientation.

From the foregoing it will be clear to skilled addressees that the present invention can be varied, adapted or otherwise modified without departing from the broad scope of the invention as hereinbefore described.

I claim:

1. An axle alignment device for a balance beam suspension system, said axle alignment device comprising:
   an axially extending sleeve engageable in an equalizer beam and movably insertable within a sleeve of a bushing, said axially extending sleeve having two ends;
   a pair of adaptors, each adaptor having a first longitudinally extending part of circular transverse cross-section, said first longitudinally extending part being rotatably engageable within a respective end of said axially extending sleeve and each adaptor having a second longitudinally extending part of circular transverse cross-section rotatably engageable within a respective beam hanger of an axle saddle bracket associated with said bushing, the longitudinal dimension of said second longitudinally extending part being no more than the thickness of the respective beam hanger;
   said second longitudinally extending part of each adaptor being axially eccentric relative to its respective first longitudinally extending part and relative to said axially extending sleeve; and
   a control tension member including a bolt extending axially through both adaptors and said axially extending sleeve, and a nut secured to said bolt to apply a force to each of said adaptors to urge said second longitudinally extending part of each of said adaptors into compression against a different one of said two ends of said axially extending sleeve to form a compressively prestressed unit.

2. The device of claim 1 wherein each said second part is of larger diameter than each said first part.

3. The device of claim 1 wherein each adaptor includes an annular flange contiguous with said second part to abut an outer surface of said respective saddle bracket hanger to prevent dislocation of said axially extending sleeve in an axial direction and to simultaneously compress against the respective saddle bracket hanger with the compression of the second longitudinal extending part against the two ends of the axially extending sleeve.

4. The device of claim 3 wherein each adaptor includes a planar surface in said annular flange to allow engagement of said flange by a tool and also to act as an indicator of the relative disposition of said first and second parts when said device is installed.

* * * * *